United States Patent [19]

Shieh et al.

[11] Patent Number: 5,393,821
[45] Date of Patent: Feb. 28, 1995

[54] CARBON BLACKS

[75] Inventors: Chiung-Huei Shieh, Lexington, Mass.; William A. Farr, London, Canada; Thomas E. McElwain, Pampa, Tex.; Roscoe W. Taylor, Abbotsford, Australia; William J. Patterson, North Andover, Mass.; Glenn E. Denstaedt, Wadsworth, Ohio; Robert R. Juengel, Roswell; Stephen G. Laube, Duluth, both of Ga.

[73] Assignee: Cabot Corporation, Boston, Mass.

[21] Appl. No.: 41,389

[22] Filed: Apr. 1, 1993

Related U.S. Application Data

[63] Continuation-in-part of Ser. No. 23,822, Feb. 23, 1993, abandoned.

[51] Int. Cl.$^6$ .............................. C08K 3/04
[52] U.S. Cl. ................... 524/495; 423/449.1; 524/492
[58] Field of Search .............. 423/449.1; 524/495, 524/492

[56] References Cited

U.S. PATENT DOCUMENTS

| | | | |
|---|---|---|---|
| 4,871,004 | 10/1989 | Brown et al. | 524/495 |
| 4,973,463 | 11/1990 | Nakai | 423/449.1 |
| 5,110,576 | 5/1992 | Soeda et al. | 423/449.1 |
| 5,230,878 | 7/1993 | Nakai et al. | 423/449.1 |

*Primary Examiner*—Michael Lewis
*Assistant Examiner*—Stuart L. Hendrickson
*Attorney, Agent, or Firm*—Lawrence A. Chaletsky

[57] ABSTRACT

Carbon blacks having a CTAB of greater than, or equal to, 140 m$^2$/g; a CDBP of greater than or equal to 115 cc/100 g; a Tint value of greater than or equal to 135%; a ΔD50 of less than or equal to 50 nm; a Dmode less than or equal to 72 nm; and an Occluded Volume Index greater than or equal to 1.30 that impart superior treadwear resistance and abrasion resistance to rubber compounds. Preferably, the carbon blacks of the present invention are further characterized by having a N$_2$SA greater than or equal to 150 m$^2$/g, and less than 180 m$^2$/g; and a DBP of greater than or equal to 140 cc/100 g. Also disclosed are rubber compounds containing the carbon blacks which exhibit increased abrasion resistance and treadwear resistance at normally utilized loading levels. Further disclosed are rubber compounds containing the carbon blacks which exhibit increased treadwear resistance/hysteresis ratios at loading levels lower than normally utilized in the compounding of tire compounds. All of the rubber compounds may additionally include silica in order to improve traction performance.

16 Claims, 2 Drawing Sheets

FIG. 1

CARBON BLACKS

This application is a continuation-in-part of U.S. patent application Ser. No. 08/023,822, filed Feb. 23, 1993, now abandoned.

FIELD OF THE INVENTION

The present invention relates to a novel class of carbon blacks that are particularly well suited for use in rubber compounds intended for use in tires. The carbon blacks advantageously impart high abrasion resistance and treadwear resistance to rubber compounds at generally utilized loading levels. The carbon blacks also advantageously impart a combination of high abrasion resistance and treadwear resistance, and reduced hysteresis, to rubber compounds when utilized at loading levels below those normally utilized. The rubber compounds containing the carbon blacks of the present invention may also include silica in order to improve the traction performance of the rubber compounds.

BACKGROUND

Carbon blacks are generally produced in a furnace-type reactor by pyrolyzing a hydrocarbon feedstock with hot combustion gases to produce combustion products containing particulate carbon black.

Carbon blacks are generally characterized on the basis of analytical properties including, but not limited to, surface area, surface chemistry, aggregate size, and particle size. The properties of carbon blacks are analytically determined by tests known to the art, including, for example CTAB, CDBP and tinting strength value (TINT). Carbon blacks may also be characterized by their $\Delta D50$, Dmode and Occluded Volume Index properties.

Carbon blacks may be utilized as pigments, fillers, reinforcing agents and for a variety of other applications. For example, carbon blacks are widely utilized as fillers and reinforcing pigments in the compounding and preparation of rubber and plastic compounds. More particularly, carbon blacks are effective in the preparation of rubber vulcanizes intended for usage in preparing tires.

It is generally understood that the properties of a carbon black affect the properties of rubber or plastic compounds containing the carbon black. Thus, the properties of a carbon black will affect the properties of tire tread compounds containing the carbon black.

It is generally desirable in the production of tires to utilize carbon black containing tire tread compounds which have satisfactory abrasion resistance. The greater the abrasion resistance of a rubber compound, the greater the treadwear resistance of a tire produced with the rubber compound and thus the greater the number of miles the tire will last before wearing out.

It is also generally desirable in the production of tires to utilize tire tread compounds, incorporating carbon blacks, which have satisfactory hysteresis. The hysteresis of a rubber compound refers to the energy dissipated under deformation. Tires produced with tread compounds having lower hysteresis values will have reduced rolling resistance which results in reduced fuel consumption by the vehicle utilizing the tire.

Accordingly, an object of the present invention is new carbon blacks that impart superior abrasion resistance and treadwear resistance to natural rubbers, synthetic rubbers and blends of natural and synthetic rubbers.

Another object of the present invention is to provide new rubber compounds having improved abrasion resistance and treadwear resistance prepared utilizing the carbon blacks of the present invention at conventional loading levels.

A further object of the present invention is to provide new rubber compounds having a combination of improved abrasion resistance and treadwear resistance, and reduced hysteresis, when prepared utilizing the carbon blacks of the present invention at loading levels below those normally utilized.

The rubber compounds containing the carbon blacks of the present invention may also include silica in order to improve the traction performance of the rubber compounds. The silica should be incorporated into the rubber compounds in amounts ranging from about 5 to about 30 parts by weight for each 100 parts by weight of the rubber component. The silica to be utilized in the preparation of the rubber compounds may be any silica known to those skilled in the art. For example, the silicas prepared by precipitation or pyrolysis techniques are suitable for use. When incorporating a silica it is also preferable to utilize any of the well-known coupling agents.

Other objects of the present invention will become apparent from the following description and the claims.

SUMMARY OF THE INVENTION

We have discovered new carbon blacks having a CTAB (cetyl-trimethyl ammonium bromide absorption value) of greater than, or equal to, 140 $m^2/g$ (square meters per gram), preferably 140–250 $m^2/g$; a CDBP (crushed dibutyl phthalate absorption) of greater than or equal to 115 cc/100 g (cubic centimeters dibutyl phthalate per 100 grams carbon black), preferably 120–150 cc/100 g; a Tint value of greater than or equal to 135%, preferably 145–180%; a $\Delta D50$ of less than or equal to 50 nm (nanometers), preferably less than or equal to 47 nm, more preferably 20–45 nm; a Dmode less than or equal to 72 nm, preferably 40–67 nm; and an Occluded Volume Index greater than or equal to 1.30, preferably 1.40–2.0. Preferably, the carbon blacks of the present invention are further characterized by having a $N_2SA$ (nitrogen surface area) greater than or equal to 150 $m^2/g$, and less than 180 $m^2/g$; and a DBP (dibutyl phthalate absorption) of greater than or equal to 140 cc/100 g, preferably 140–180 cc/100 g.

The carbon blacks of the present invention may be produced in a furnace carbon black reactor having a first (combustion) zone, a transition zone, and a reaction zone. A carbon black yielding feedstock is injected in any manner known to the art into a hot combustion gas stream. The resultant mixture of hot combustion gases and feedstock passes into the reaction zone. Pyrolysis of the carbon black yielding feedstock is stopped by quenching the mixture when the carbon blacks of the present invention have been formed. Preferably pyrolysis is stopped by injecting a quenching fluid. A process for preparing the novel carbon black of the present invention will be described in greater detail hereinafter.

We have also discovered new rubber compounds containing the carbon blacks.

The rubbers for which the novel carbon black of this invention are effective include natural and synthetic rubbers or blends or mixtures thereof. The term "loading" or "loading level" refers to the amount of carbon black utilized in the compounding of the rubber compound incorporating the carbon black. Generally, to produce rubber compounds having superior abrasion resistance and treadwear resistance, amounts of the carbon black of the present invention ranging from about 10 to about 250 parts by weight can be used for each 100 parts by weight of rubber, preferably, amounts varying from about 10 to about 100 parts by weight of carbon black per 100 parts by weight of rubber. To achieve rubber compounds having a combination of superior abrasion resistance and treadwear resistance, and low hysteresis, amounts ranging from about 10 to about 45 parts of carbon black per 100 parts of rubber may be utilized.

The rubber compounds containing the carbon blacks of the present invention may also include silica in order to improve the traction performance of the rubber compounds. The silica should be incorporated into the rubber compounds in amounts ranging from about 5 to about 30 parts by weight for each 100 parts by weight of the rubber component. The silica to be utilized in the preparation of the rubber compounds may be any silica known to those skilled in the art. For example, the silicas prepared by precipitation or pyrolysis techniques are suitable for use. When incorporating a silica it is also preferable to utilize any of the well-known coupling agents.

The treadwear resistance/hysteresis ratio of rubber compounds intended for use in tire tread compounds is important to those of ordinary skill in the art. Higher treadwear resistance/hysteresis ratios are generally advantageous. As an example, tire tread compounds produced from rubber compounds incorporating VULCAN® 10H carbon black, manufactured and sold by Cabot Corporation, Boston, Mass., have treadwear resistance/hysteresis ratios of approximately 1.0 when both properties are expressed relative to a standard tread compound.

The carbon blacks of the present invention impart improved abrasion resistance and treadwear resistance at loading levels normally utilized for tire compounds. Moreover, we have found that the loading levels of the carbon blacks of the present invention in rubber compounds may be reduced below levels generally utilized in tire compounds, resulting in tire compounds having reduced hysteresis values, while maintaining the superior abrasion resistance and treadwear resistance of the rubber compound.

Among the rubbers suitable for use with the present invention are any natural rubbers, synthetic rubbers, and blends of natural and synthetic rubbers. Typical of the rubbers are styrene-butadiene rubbers (SBR) generally known in the art including, but not limited to, oil extended and clear: emulsion SBR's, high styrene SBR's, solution SBR's, starred solution SBR's and functionalized solution SBR's.

An advantage of the carbon blacks of the present invention is that the carbon blacks impart improved abrasion resistance and treadwear resistance to natural rubbers, synthetic rubbers and blends of natural and synthetic rubbers incorporating the carbon blacks.

Another advantage of the carbon blacks of the present invention is that the carbon blacks impart a combination of improved abrasion resistance and treadwear resistance, and lower hysteresis, to natural rubbers, synthetic rubbers and blends of natural and synthetic rubbers when the carbon blacks are incorporated at loading levels below those normally utilized to prepare tread compounds.

An advantage of the rubber compounds of the present invention is that the rubber compounds are particularly well suited for use in producing passenger car, truck and bus tires having a higher level of treadwear resistance resulting in the tires having longer lives when compared with tires produced with rubber compounds incorporating conventional carbon blacks. These characteristics of tires are particularly advantageous in all season tires, touring tires and high performance tires for passenger vehicles and in light and medium truck/bus tires.

Another advantage of the rubber compounds of the present invention is that the rubber compounds incorporating the carbon blacks of the present invention at low loading levels are particularly well suited for use in producing tires having a higher level of treadwear resistance and reduced rolling resistance when compared to tires produced with rubber compounds incorporating conventional carbon blacks at similar reduced loading levels. Rubber compounds incorporating the carbon blacks of the present invention at low loading levels are particularly well suited for use in passenger, light and medium track, and off the road fires where minimizing hysteresis while maintaining treadwear resistance is beneficial. For example, in light truck and passenger car tires, fuel economy is important and advantageously increased by tire compounds having reduced hysteresis. In medium radial truck tires, in addition to increasing fuel economy, minimizing hysteresis maximizes carcass durability which maximizes retreadability. In off the road fires, performance is often measured in ton-miles-per-hour which is increased by minimizing hysteresis.

Other advantages of the present invention will become apparent from the following more detailed description of the invention.

DETAILED DESCRIPTION OF THE INVENTION

The carbon blacks of the present invention are characterized by the following combination of analytical properties:

CTAB ≧ 140 m$^2$/g, preferably 140 m$^2$/g ≦ CTAB ≦ 250 m$^2$/g;

CDBP ≧ 115 cc/100 g, preferably 120 cc/100 g ≦ CDBP ≦ 150 cc/100 g;

Tint ≧ 135, preferably 145% ≦ Tint ≦ 180%;

ΔD50 ≦ 50 nm, preferably ΔD50 ≦ 47 nm, more preferably 20 nm ≦ ΔD50 ≦ 45 nm;

Dmode ≦ 72 nm, preferably 40 nm ≦ Dmode ≦ 67 nm; and

Occluded Volume Index ≦ 1.30; preferably 1.40 ≦ Occluded Volume Index ≦ 2.0.

Preferably, the carbon blacks of the present invention are further characterized by having:

150 m$^2$/g ≦ N$_2$SA < 180 m$^2$/g; and

DBP ≦ 140 cc/100 g, preferably 140 cc/100 g ≦ DBP ≦ 180 cc/100 g.

Figure 1:
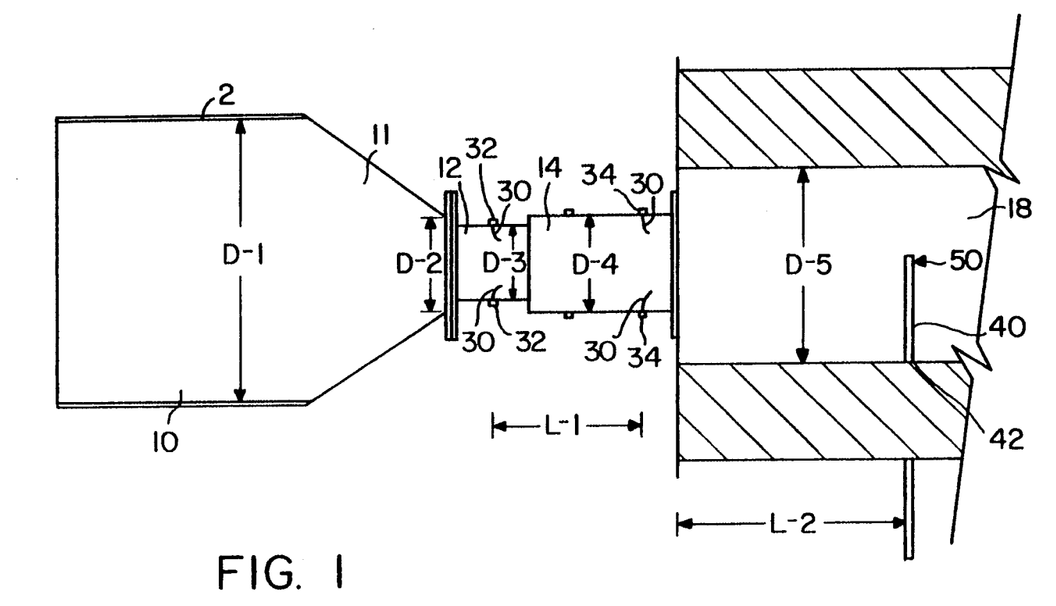
FIG. 1 is a cross-sectional view of a portion of one type of furnace carbon black reactor which may be utilized to produce the carbon blacks of the present invention.

The carbon blacks of the present invention may be produced in a modular, also referred to as "staged", furnace carbon black reactor. A section of a typical modular furnace carbon black reactor which may be utilized to produce the carbon black of the present invention is depicted in FIG. 1. Other details of a typical modular furnace carbon black reactor may be found for example in the description contained in U.S. Pat. No. 3,922,335, the disclosure of which is herein incorporated by reference.

Referring to FIG. 1, the carbon blacks of the present invention may be produced in a furnace carbon black reactor 2, having: a combustion zone 10, which has a zone of converging diameter 11; feedstock injection zones 12 and 14; and reaction zone 18. The diameter of the combustion zone, 10, up to the point where the zone of converging diameter, 11, begins is shown as D-1; the diameter of the converging zone, 11, at the narrowest point, is shown as D-2; the diameter of zone 12, as D-3, the diameter of zone 14, as D-4, and the diameter of the reaction zone, 18, as D-5.

To produce the carbon blacks of the present invention hot combustion gases are generated in zone 10 by contacting liquid or gaseous fuel with a suitable oxidant stream such as air, oxygen, mixtures of air and oxygen or the like. Among the fuels suitable for use in contacting the oxidant stream in combustion zone 10 to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. The ratio of air/fuel utilized to produce the carbon blacks of the present invention may preferably be between 8:1 and 20:1. As understood by those of ordinary skill in the art, to facilitate the generation of hot combustion gases, the oxidant stream may be preheated.

The hot combustion gas stream flows downstream from zones 10 and 11 into zones 12, 14 and then 18. Carbon black-yielding feedstock, 30 is introduced at point 32, located in zone 12, and at point 34, located in zone 14. Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like. To produce the carbon blacks of the present invention feedstock may be injected in an amount of from about 50% to about 80%, by weight, at point 32, and the remainder of the total amount of from about 20% to about 50%, by weight, injected at point 34. Preferably, from about 55% to about 70% of the total amount of feedstock, by weight, is introduced at point 32, and the remainder of the total amount of feedstock, from about 45% to about 30%, by weight, is introduced at point 34. In the examples described herein, carbon black-yielding feedstock, 30, was injected substantially transversely from the periphery of the stream of hot combustion gases in the form of a plurality of small, coherent jets which penetrated into the interior regions of the hot combustion gas stream to insure a high rate of mixing and shearing of the hot combustion gases and the carbon black-yielding feedstock so as to rapidly and completely decompose and convert the feedstock to the novel carbon blacks of the present invention. The distance between point 32 and point 34 is shown in the figure as L-1.

The mixture of carbon black-yielding feedstock and hot combustion gases flows downstream from zones 12 and 14, into reaction zone 18. Quench 40, located at point 42, injecting quenching fluid 50, is utilized to cool the mixture of carbon black-yielding feedstock and hot combustion gases, to stop pyrolysis of the carbon black-yielding feedstock when the novel carbon blacks of the present invention are formed. Point 42 may be determined in any manner known to the art for selecting the position of a quench to stop pyrolysis. One method for determining the position of the quench which stops pyrolysis is by determining the point at which an acceptable toluene extract level for the carbon blacks of the present invention is achieved. Toluene extract level may be measured by using ASTM Test D1618-83 "Carbon Black Extractables—Toluene Discoloration". L-2 is the distance from the beginning of zone 18, to point 42, and will vary according to the position of the quench.

After the mixture of hot combustion gases and carbon black-yielding feedstock is quenched, the cooled gases containing the carbon blacks of the present invention pass downstream into any conventional cooling and separating means whereby the carbon blacks of the present invention are recovered. The separation of the carbon black from the gas stream is readily accomplished by conventional means such as a precipitator, cyclone separator and bag filter. This separation may be followed by pelletizing using, for example, a wet pelletizer.

The following testing procedures are used in the determination and evaluation of the analytical properties of the carbon blacks of the present invention, and the physical properties of the rubber compounds incorporating the carbon blacks of the present invention.

Carbon Black Analytical Properties

The CTAB of the carbon blacks was determined according to ASTM Test Procedure D3765-85. The iodine absorption number ($I_2No.$) of the carbon blacks was determined according to ASTM Test Procedure D1510. The nitrogen surface area ($N_2SA$) of the carbon blacks was determined according to ASTM Test Procedure D3037-Method A. The dibutyl phthalate absorption value (DBP) of the carbon was determined according to ASTM Test Procedure D3493-86. Tinting strength (Tint) of the carbon blacks was determined according to ASTM Test Procedure D3265-85a. The CDBP of the carbon black was determined according to the procedure set forth in ASTM D3493-86.

The Occluded Volume Index of a carbon black is a measure of the internal void volume of the carbon black aggregates. The significance of the Occluded Volume Index of a carbon black is known to those of ordinary skill and was published by Medalia (A. I. Medalia, *J Colloid Interface Sci.* 32, 115 (1970)) and more recently discussed by Herd et al. (C. R. Herd, G. C. McDonald and W. M. Hess, Rubber Chem. and Tech. 65, 107 (1992)).

The Occluded Volume Index of a carbon black is determined using certain parameters of carbon black aggregate morphology obtained through the use of electron microscopy and image analysis. The procedure for electron microscopy follows ASTM Standard D-

3849-87 "Standard Test Method for Carbon Black—Primary Aggregate Dimensions from Electron Microscope Image Analysis". The definitions of A ("Area") and P ("Perimeter") are contained in Section 11, Calculations, of D-3849:

A = projected area of a carbon black aggregate
P = perimeter of the aggregate.

The "Diameter of an Equivalent Circle" ($D_c$) is a geometric transform of the Area measurement, and is defined as and calculated by:

$$D_c = \sqrt{4A/\pi}.$$

$V_{es}$ is defined as the volume of an equivalent sphere wherein:

$V_{es}$ = volume of an equivalent sphere = $\pi/6(D_c)^3$.

$V_{agg}$ is defined as the volume of the carbon black aggregate wherein:

$V_{agg}$ = volume of the carbon black aggregate = $8A^2/3P$.

The Occluded Volume Index of a carbon black is determined from $V_{es}$ and $V_{agg}$ using the following relationship:

$$\text{Occluded Volume Index} = \frac{(V_{es} - V_{agg})}{V_{agg}}.$$

Figure 2:
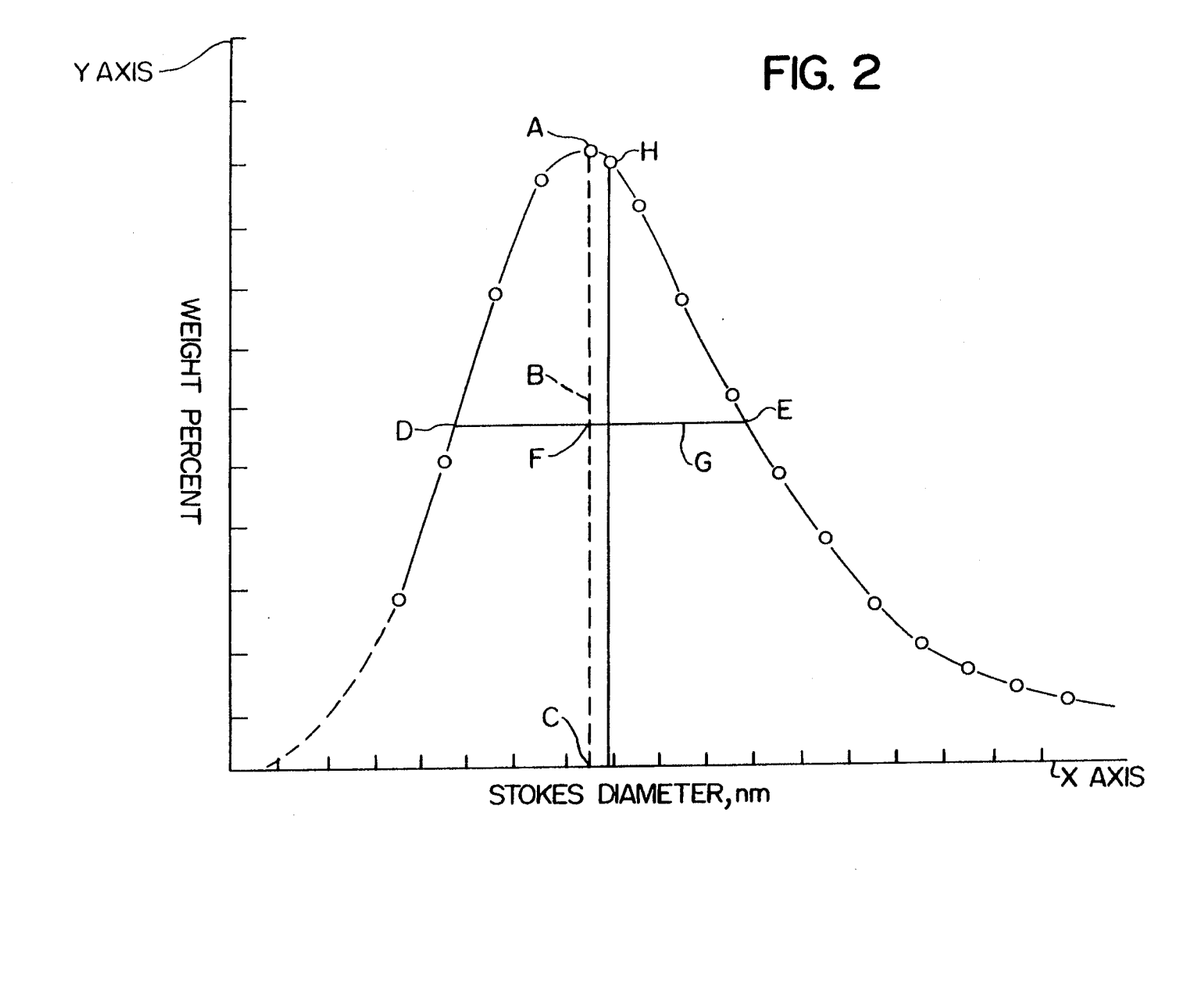
FIG. 2 is a sample histogram of the weight fraction of the aggregates of a carbon black sample versus the Stokes Diameter in a given sample.

Dmode and ΔD50 of the carbon blacks were determined in the following manner. A histogram is made of the Stokes diameter of the aggregates of the carbon black sample versus the relative frequency of their occurrence in a given sample. As shown in FIG. 2, a line (B) is drawn from the peak (A) of the histogram in a direction parallel to the Y axis and ending at the X-axis at point (C) of the histogram. The midpoint (F) of the resultant line (B) is determined and a line (G) is drawn through the midpoint (F) thereof parallel to the X-axis. Line (G) intersects the distribution curve of the histogram at two points D and E. The absolute value of the difference of the two Stokes diameters of the carbon black particles at points D and E is the ΔD50 value.

The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

The following information is entered into the computer which then records additional data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C.;
6. The disk speed, which in this instance is 8000 rpm;
7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density, and rate of sedimentation as the object. The customary units are expressed in nanometer diameters.

Mode (Dmode for reporting purposes)—The Stokes diameter at the point of the peak (Point A of FIG. 2 herein) of the distribution curve for Stokes diameter.

Median Stokes diameter—(Dst for reporting purposes) the point on the distribution curve of Stokes diameter where 50% by weight of the sample is either larger or smaller. It therefore represents the median value of the determination.

Rubber Compound Testing Procedures

The abrasion resistance data of the rubber compounds were determined using an abrader which is based on a Lambourn type machine. Abrasion resistance rates (cubic centimeter/centimeter travel) were measured at 7%, 13% and 21% slip. The slip is based on the relative velocity between the sample wheel and grindstone. In the following examples, the abrasion resistance index is the ratio of the abrasion resistance rate of a control compound containing VULCAN® 10H carbon black, a trademarked product of Cabot Corporation, Boston, Mass. divided by the abrasion resistance rate of a compound produced using a specified carbon black of the present invention, at the same slip.

The modulus, tensile and elongation of the rubber compounds were measured by the procedure set forth in ASTM D412.

The Shore A Hardness of the rubber compounds was determined according to the procedure set forth in ASTM D-2240-86.

Rebound data were determined on all rubber samples utilizing a ZWICK Rebound Resilience Tester, Model 5109, manufactured by Zwick of America, Inc., Post Office Box 997, East Windsor, Conn. 06088. Instructions for determining the rebound values accompany the instrument.

The dynamic mechanical properties of the rubber compounds were determined in a manner well known to those of ordinary skill in the art, using an Instrom Model 1332 Servohydraulic System. The standard test conditions were as follows: 10% double strain amplitude; 10 Hz frequency; 15% mean level and 70° C. testing temperature. The specimen tested for each of the rubber compounds consisted of a cylinder 25.4 mm, in height, and 17.8 mm, in diameter. The dynamic mechanical properties were measured in a compression mode and included complex modulus (E*), elastic modulus (E'), and loss modulus (E''), with the tangent of the phase angle delta equal to loss modulus divided by elastic modulus (tangent delta=$\tan\partial$=E''/E').

Treadwear resistance of the tire compounds referred to in the following examples was determined in a manner well known in the art and described in Cabot Corporation's Technical Service Report No. TG-67-1 on "The Use of Multi-Section Treads in Tire Testing" by Fred E. Jones (1967) with the exception that radial tires were substituted for bias-ply tires. A standard multi-section tread technique, i.e., five tires/seven tread sections per tire was utilized. Arrangement of the tread sections on the tires, as well as mixing and lab testing of the compounds was according to a randomized block design so as to provide a statistically sound analysis of the data. The treadwear resistance evaluations are made relative to a standard reference carbon black which is arbitrarily assigned a wear rating value of 100 percent. In the following examples, an ASTM N220 type carbon black, manufactured and sold by Cabot Corporation, Boston, Mass. and further characterized by having a Tint of 111%, an $I_2$No. of 121 mg/g, a DBP of 115 cc/100 g, and a density of 22 lbs./cu.ft., was utilized as the reference carbon black. The road test was run at a nominal rate of 60±10 miles/mil (based on the control compound) for 10,000 miles.

The effectiveness and advantages of the present invention will be further illustrated by the following examples.

EXAMPLES 1-3

Three examples of the novel carbon blacks of the present invention were prepared in a reactor generally described herein, and as depicted in FIG. 1, utilizing the reactor conditions and geometry set forth in Table 2. The fuel utilized in the combustion reaction in each of the examples was natural gas. The feedstock utilized in each of the examples had the properties indicated in Table 1 below:

TABLE 1

| Feedstock Properties | | | |
|---|---|---|---|
|  | Example 1 | Example 2 | Example 3 |
| Hydrogen/Carbon Ratio | 0.96 | 0.96 | 0.95 |
| Hydrogen (wt. %) | 7.44 | 7.44 | 7.33 |
| Carbon (wt. %) | 91.5 | 91.5 | 91.9 |
| Sulfur (wt. %) | 0.7 | 0.7 | 0.3 |
| A.P.I. Gravity 15.6/15.6 C(60)F [ASTM D-287] | −1.4 | −1.4 | −1.8 |
| Specific Gravity 15.5/15.6 C(60)F [ASTM D-287] | 1.088 | 1.088 | 1.091 |
| Viscosity, SUS (54.4° C.) [ASTM D-88] | 105.0 | 105.0 | 155.7 |
| Viscosity, SUS (98.9° C.) [ASTM D-88] | 4.6 | 4.6 | 7.3 |
| BMCI (Visc-Grav) | 131 | 131 | 132 |

The reactor conditions and geometry are set forth in Table 2 below.

TABLE 2

| CARBON BLACKS | | | |
|---|---|---|---|
|  | Ex. 1 | Ex. 2 | Ex. 3 |
| D-1, in. | 7.25 | 7.25 | 7.25 |
| D-2, in. | 5.5 | 5.5 | 5.5 |
| D-3, in. | 4.5 | 4.5 | 4.5 |
| D-4, in. | 5.3 | 5.3 | 5.3 |
| D-5, in. | 9.0 | 9.0 | 9.0 |
| L-1, in. | 18 | 18 | 18 |
| L-2, ft. | 2.5 | 2.5 | 1.67 |
| Oil Inj Pt. 32,) Tips # × Size, in.) | 6 × 0.020 | 6 × 0.020 | 6 × 0.016 |
| Oil Rate 32, gph | 75.6 | 75.6 | 75.0 |
| Oil Press. 32, psig | 375 | 375 | 975 |
| Oil Preheat, 32, °F. | 300 | 300 | 350 |
| Oil Inj. Pt. 34,) Tips # × Size, in.) | 3 × 0.025 | 3 × 0.025 | 4 × 0.018 |
| Oil Rate 34, gph | 50.5 | 50.5 | 32.5 |
| Oil Press. 34, psig | 350 | 350 | 275 |
| Oil Preheat 34, °F. | 300 | 300 | 350 |
| Comb. Air, kscfh | 110 | 110 | 110 |
| Comb. Air Preheat, °F. | 1000 | 1000 | 1000 |
| Natural Gas, kscfh | 9.85 | 9.85 | 9.76 |
| Air/Burn Gas Ratio | 9.7 | 9.7 | 9.8 |
| K+, gK+/100 gal oil | 0 | 1.5 | 0 |
| Quench Press., psi | 100 | 100 | 145 |
| Temp. at Quench, °F. | 1350 | 1350 | 1350 |

Inj. = Injection; Comb. = combustion; Press. = pressure 32 = Point 32 on FIG. 1; 34 = Point 34 on FIG. 1; gph = gallons/hour; psi = pounds/square inch; in. = inches; ft. = feet; °F. = degrees Fahrenheit; kscfh = standard cubic feet/hour, in 1000's K+ = potassium; gK+/100 gal oil = grams K+/100 gallons feedstock (oil)

The carbon blacks produced in Examples 1-3 were then analyzed according to the procedures described herein. The analytical properties of the blacks produced, after wet pelletizing and drying, and of a control carbon black are shown in Table 3. The control is VULCAN® 10H carbon black, an ASTM N134 type carbon black manufactured and sold by Cabot Corporation, Boston, Mass. VULCAN® 10H carbon black is recognized in the tire industry as a carbon black imparting a high level of treadwear resistance.

TABLE 3

| Carbon Black Analytical Properties | | | | |
|---|---|---|---|---|
| Carbon Black | Ex. 1 | Ex. 2 | Ex. 3 | VULCAN® 10H Carbon Black (Control) |
| CTAB (m²/g) | 148 | 148 | 170 | 135 |
| I₂No. (mg/g) | 158 | 150 | 163 | 142 |
| N₂SA (m²/g) | 157 | 157 | 174 | 142 |
| DBP cc/100 g | 142 | 165 | 154 | 127 |
| CDBP (cc/100 g) | 120 | 127 | 121 | 102 |
| Tint (%) | 150 | 147 | 154 | 132 |
| Dmode (nm) | 59 | 64 | 53 | 76 |
| ΔD50 (nm) | 40 | 42 | 33 | 58 |

TABLE 3-continued

Carbon Black Analytical Properties

| Carbon Black | Ex. 1 | Ex. 2 | Ex. 3 | VULCAN ® 10H Carbon Black (Control) |
|---|---|---|---|---|
| Occluded Volume Index | 1.49 | 1.52 | 1.58 | 1.20 |

EXAMPLE 4

This Example illustrates the use of the carbon blacks of the present invention in a truck tire model rubber compound formulation in comparison with the same rubber compound containing the control carbon black. Rubber compound A was made with the carbon black of the present invention produced in Example 1. Rubber compound B was made with the carbon black of the present invention produced in Example 3. Rubber compound C was made with the control carbon black. Rubber compounds A, B and C were prepared according to the truck tire model rubber compound formulation shown below in Table 4.

TABLE 4

TRUCK TIRE MODEL RUBBER COMPOUND FORMULATION

| INGREDIENT | Parts by weight |
|---|---|
| Natural Rubber | 100.0 |
| Carbon Black | 45.0 |
| Zinc Oxide | 5.0 |
| Stearic Acid | 3.0 |
| Santoflex 13 | 1.5 |
| Sunproof Improved Wax | 1.5 |
| Age Rite Resin D | 1.5 |
| Santocure MOR | 1.2 |
| Sulfur | 1.8 |

Santoflex 13 is an antiozonant manufactured and sold by Monsanto Company; Sunproof Improved Wax is the tradename for an antiozonant sold by Uniroyal Chemical Company; Age Rite Resin D is an antioxidant manufactured and sold by R. T. Vanderbilt Company; Santocure MOR is the trade designation for an accelerator manufactured and sold by Monsanto Company.

The properties of the rubber compounds A-C were then evaluated according to the procedures described herein. The results were as shown in Table 5:

TABLE 5

| Rubber Comp. | Carbon Black | Modulus 100% (psi) | Modulus 300% (psi) | Tensile Strength (psi) | $E_b$* (%) | Shore A Hardness |
|---|---|---|---|---|---|---|
| A | Ex. 1 | 635 | 2918 | 4513 | 447 | 75 |
| B | Ex. 3 | 579 | 2732 | 4432 | 451 | 74 |
| C | VULCAN ® 10H carbon black | 496 | 2560 | 4407 | 468 | 71 |

*$E_b$ = elongation at break; psi = pounds/square inch

The results show that in general, the physical properties of rubber compounds A and B, produced with the carbon blacks of the present invention, and rubber compound C, produced with the control carbon black, are comparable. Moreover, the advantage of the carbon blacks of the present invention in enhancing the abrasion resistance and treadwear resistance of rubber compounds is shown by the following results.

The abrasion resistance index and rebound value of each rubber compound were also determined as described herein. The results were as shown in Table 6 where VULCAN ® 10H carbon black was used both as the control and the reference carbon black:

TABLE 6

| Rubber Compound | Carbon Black | 7% Slip (%) | 13% Slip (%) | 21% Slip (%) | Rebound at 70° C. (%) |
|---|---|---|---|---|---|
| A | Ex. 1 | 106 | 105 | 113 | 61.7 |
| B | Ex. 3 | 111 | 112 | 109 | 59.7 |
| C | VULCAN ® 10H carbon black | 100 | 100 | 100 | 64.9 |

The performance advantages of utilizing the carbon blacks of the present invention in truck tire rubber compounds is clearly demonstrated by the results in Table 6 showing that the carbon blacks of the present invention impart significantly higher abrasion resistance than the control carbon black. The lower rebound values of natural rubber compounds A and B, incorporating the carbon blacks of the present invention, indicate that the compounds have increased hysteresis in comparison with natural rubber compound C, incorporating the VULCAN ® 10H carbon black, which would be expected in view of the increased abrasion resistance properties of compounds A and B.

EXAMPLE 5

This Example illustrates the improved treadwear resistance of natural rubber tire compounds containing the carbon blacks of the present invention in comparison with the same rubber compound containing the control carbon black. Tire compound D was made with the carbon black of Example 1. Tire compound E was made with the carbon black of Example 2. Tire compound F was made with the control VULCAN ® 10H carbon black. Tire compounds D, E and F were prepared according to the natural rubber road test compound formulation shown below in Table 7.

TABLE 7

NATURAL RUBBER ROAD TEST TIRE COMPOUND FORMULATION

| INGREDIENT | Parts by weight |
|---|---|
| Natural Rubber | 100.0 |
| Carbon Black | 50.0 |
| Oil | 5.0 |
| Zinc Oxide | 5.0 |
| Stearic Acid | 3.0 |
| Santoflex 13 | 1.5 |
| Sunproof Improved Wax | 1.5 |
| Age Rite Resin D | 1.5 |
| Santocure MOR | 1.2 |
| Sulfur | 1.8 |

The Oil utilized was Circolite oil, a light naphthenic manufactured and sold by Sun Refining and Marketing Company. Santoflex 13; Sunproof Improved Wax; Age Rite Resin D and Santocure MOR are described in Example 4.

The treadwear resistance properties of the road test tire compounds were then determined according to the treadwear resistance procedure described herein. The results were as shown in Table 8:

TABLE 8

| Road Test Tire Compound | Carbon Black | TDWR | Tan delta |
|---|---|---|---|
| D | Example 1 | 141 | 0.197 |
| E | Example 2 | 138 | 0.191 |
| F | VULCAN ® 10H carbon black (control) | 111 | 0.178 |

TDWR = Treadwear resistance rating

The results show that road test tire compounds D and E produced with the carbon blacks of the present invention have significantly increased treadwear resistance in comparison to road test tire compound F produced with the control carbon black. The higher tan delta values of road test tire compounds D and E, incorporating the carbon blacks of the present invention, indicate that the compounds have increased hysteresis in comparison with road test tire compound F, incorporating the VULCAN ® 10H carbon black, which would be expected in view of the increased treadwear resistance properties of compounds D and E.

EXAMPLE 6

This example illustrates the significantly improved treadwear resistance/hysteresis relationship of rubber compounds containing the carbon blacks of the present invention at loading levels lower than conventionally utilized in preparing rubber tire compounds, in comparison with the same rubber compound prepared using the control VULCAN ® 10H carbon black.

Rubber road test compounds were prepared utilizing the carbon blacks produced in Example 1 and Example 2. For comparison purposes, rubber road test compounds were also prepared utilizing the control VULCAN ® 10H carbon black to illustrate the results obtained when the control VULCAN ® 10H carbon black was incorporated at different loading levels. The loading levels of the control VULCAN ® 10H carbon black cover both those instances where abrasion resistance properties are sought and those instances where reduced hysteresis is desired.

Table 9 shows the carbon black that was utilized in each rubber compound.

TABLE 9

| Carbon Black | Rubber Road Test Compound |
|---|---|
| Example 1 | G |

TABLE 9-continued

| Carbon Black | Rubber Road Test Compound |
|---|---|
| Example 1 | H |
| Example 1 | I |
| Example 2 | J |
| Example 2 | K |
| Example 2 | L |
| VULCAN ® 10H | M |
| VULCAN ® 10H | N |
| VULCAN ® 10H | O |
| VULCAN ® 10H | P |

Rubber road test compounds G through L were prepared utilizing carbon blacks of the present invention according to the rubber compound formulation set forth in Table 10 below.

TABLE 10

Rubber Road Test Tire Compound Formulation

| Compound Carbon Black Ingredient | G Ex. 1 | H Ex. 1 | I Ex. 1 | J Ex. 2 | K Ex. 2 | L Ex. 2 |
|---|---|---|---|---|---|---|
| | | | Parts by Weight | | | |
| SBR 1500 | 65.00 | 65.00 | 65.00 | 65.00 | 65.00 | 65.00 |
| High Cis BR | 35.00 | 35.00 | 35.00 | 35.00 | 35.00 | 35.00 |
| Carbon Black | 58.00 | 50.00 | 40.00 | 52.00 | 40.00 | 35.00 |
| Sundex 790 | 23.00 | 14.00 | 5.00 | 17.00 | 6.00 | 3.00 |
| Zinc Oxide | 3.00 | 3.00 | 3.00 | 3.00 | 3.00 | 3.00 |
| Stearic Acid | 2.00 | 2.00 | 2.00 | 2.00 | 2.00 | 2.00 |
| Sunproof Impr. Wax | 2.50 | 2.50 | 2.50 | 2.50 | 2.50 | 2.50 |
| Wingstay 100 | 2.00 | 2.00 | 2.00 | 2.00 | 2.00 | 2.00 |
| Santocure MOR | 1.50 | 1.50 | 1.50 | 1.50 | 1.50 | 1.50 |
| MBT | 0.20 | 0.20 | 0.20 | 0.20 | 0.20 | 0.20 |
| Sulfur | 1.75 | 1.75 | 1.75 | 1.75 | 1.75 | 1.75 |

SBR 1500 is a styrene butadiene rubber manufactured and sold by Copolymer Corporation.
High Cis BR is a high cis content butadiene rubber manufactured and sold by Polysar.
Sundex 790 is the tradename for a plasticizer sold by Sun Oil Company.
Sunproof Impr. (Improved) Wax is described in Example 4.
Wingstay 100 is the tradename for a stabilizer comprising mixed diaryl-n-phenylene diamines sold by Goodyear Tire and Rubber Company.
Santocure MOR is described in Example 4.
MBT is mercaptobenzothiazole.

Rubber road test compounds M through P were prepared utilizing the VULCAN ® 10H carbon black according to the rubber compound formulation set forth in Table 11 below.

TABLE 11

Rubber Road Test Tire Compound Formulation

| Compound Carbon Black Ingredient | M VULCAN ® 10H | N VULCAN ® 10H | O VULCAN ® 10H | P VULCAN ® 10H |
|---|---|---|---|---|
| | | Parts by Weight | | |
| SBR 1712 | 89.38 | 89.38 | 89.38 | 89.38 |
| High Cis BR | 35.00 | 35.00 | 35.00 | 35.00 |
| Carbon Black | 65.00 | 55.00 | 50.00 | 45.00 |
| Sundex 790 | 10.62 | 5.62 | 3.12 | 0.62 |
| Zinc Oxide | 3.00 | 3.00 | 3.00 | 3.00 |
| Stearic Acid | 2.00 | 2.00 | 2.00 | 2.00 |
| Sunproof Impr. Wax | 2.50 | 2.50 | 2.50 | 2.50 |
| Wingstay 100 | 2.00 | 2.00 | 2.00 | 2.00 |
| Santocure MOR | 1.50 | 1.50 | 1.50 | 1.50 |
| MBT | 0.20 | 0.20 | 0.20 | 0.20 |
| Sulftir | 1.75 | 1.75 | 1.75 | 1.75 |

SBR 1712 is a styrene butadiene rubber containing 35 phr oil per 100 phr polymer, manufactured and sold by Copolymer Corporation; High Cis BR, Sundex 790, Sunproof Impr. (Improved) Wax, Wingstay 100, Santocure MOR and MBT are explained above with reference to Table 10.

The treadwear resistance and tan delta properties of the road test tire compounds were then evaluated according to the procedures described herein. The results were as shown in Table 12:

TABLE 12

| Compound | Carbon Black | Carbon Black Loading (phr) | TDWR | Tan delta | Tan delta (% N220) | TDWR Tan delta (% N220) |
|---|---|---|---|---|---|---|
| G | Ex. 1 | 58.00 | 113 | 0.212 | 138 | 0.82 |
| H | Ex. 1 | 50.00 | 119 | 0.179 | 116 | 1.03 |
| I | Ex. 1 | 40.00 | 129 | 0.137 | 88 | 1.47 |
| J | Ex. 2 | 52.00 | 124 | 0.188 | 122 | 1.02 |
| K | Ex. 2 | 40.00 | 126 | 0.137 | 89 | 1.42 |
| L | Ex. 2 | 35.00 | 119 | 0.117 | 76 | 1.57 |
| M | VULCAN ® 10H | 65.00 | 115 | 0.178 | 116 | 0.99 |
| N | VULCAN ® 10H | 55.00 | 104 | 0.156 | 102 | 1.02 |
| O | VULCAN ® 10H | 50.00 | 85 | 0.138 | 90 | 0.95 |
| P | VULCAN ® 10H | 45.00 | 81 | 0.131 | 85 | 0.95 |

TDWR = Treadwear resistance rating.
Tan delta (% N220) equals the tan delta value expressed as a percentage of the tan delta value of the ASTM N220 type carbon black utilized in the procedure for determining the treadwear resistance described herein.

It is well known to those of ordinary skill in the art that the tan delta of a rubber compound is a measure of the rubber compound's hysteresis. The above data shows that at reduced loadings tire compounds containing the control VULCAN® 10H carbon black had reduced treadwear resistance and reduced hysteresis values. In contrast, while tire compounds containing the carbon blacks of the present invention at reduced loadings also exhibit reduced hysteresis, the superior treadwear resistance is maintained. As a result, the treadwear resistance/tan delta ratios of the tire compounds incorporating the carbon blacks of the present invention at reduced loadings are unusually high.

The static properties of road test tire compounds I, L and M were also evaluated according to the procedures described herein. The results are set forth in Table 13.

TABLE 13

Static Properties of Road Test Tire Compounds

| Rubber Compound | Carbon Black | Carbon Black Loading (phr) | Modulus 300% (psi) | Tensile Strength (psi) | $E_b$* (%) | Shore A Hardness |
|---|---|---|---|---|---|---|
| M | VULCAN ® 10H | 65.00 | 1416 | 3244 | 520 | 65 |
| I | Ex. 1 | 40.00 | 1873 | 3179 | 426 | 64 |
| L | Ex. 2 | 35.00 | 1926 | 3039 | 405 | 64 |

*$E_b$ = elongation at break; psi = pounds/square inch

These results indicate the static properties of the road test rubber compounds produced with the carbon blacks of the present invention are comparable to those of a compound produced with the control VULCAN® 10H carbon black.

The results set forth above indicate that incorporating the carbon blacks of the present invention at loading levels lower than conventionally utilized in the compounding of rubber tire compounds, will result in tires having reduced rolling resistance and/or heat build up, resulting from the reduced hysteresis, and improved treadwear resistance.

It should be clearly understood that the forms of the present invention herein described are illustrative only and are not intended to limit the scope of the invention.

We claim:

1. A carbon black having a CTAB of greater than, or equal to, 140 m$^2$/g; a CDBP of greater than or equal to 115 cc/100 g; a Tint value of greater than or equal to 135%; a ΔD50 of less than or equal to 50 nm; a Dmode less than or equal to 72 nm; and an Occluded Volume Index greater than or equal to 1.30.

2. The carbon black of claim 1 wherein the CTAB is 140–250 m$^2$/g; the CDBP is 120–150 cc/100 g; the Tint value is 145–180%; the ΔD50 is less than or equal to 47 nm; the Dmode is 40–67 nm; and the Occluded Volume Index is 1.40–2.0.

3. The carbon black of claim 2 wherein the ΔD50 is 20–45 nm.

4. The carbon black of claim 1 further characterized by having a N$_2$SA greater than or equal to 150 m$^2$/g, and less than 180 m$^2$/g; and a DBP of greater than or equal to 140 cc/100 g.

5. The carbon black of claim 4 wherein the DBP is 140–180 cc/100 g.

6. The carbon black of claim 1 wherein the CTAB is 148; the CDBP is 120 cc/100 g; the Tint value is 150%; the ΔD50 is 40; the Dmode is 59; and the Occluded Volume Index is 1.49.

7. The carbon black of claim 1 wherein the CTAB is 148; the CDBP is 127 cc/100 g; the Tint value is 147%; the ΔD50 is 42; the Dmode is 64; and the Occluded Volume Index is 1.52.

8. The carbon black of claim 1 wherein the CTAB is 170; the CDBP is 121 cc/100 g; the Tint value is 154%; the ΔD50 is 33; the Dmode is 53; and the Occluded Volume Index is 1.58.

9. A rubber composition comprising about 100 parts, by weight, of a rubber and from about 10 to about 250 parts, by weight, of a carbon black having a CTAB of greater than, or equal to, 140 m$^2$/g; a CDBP of greater than or equal to 115 cc/100 g; a Tint value of greater than or equal to 135%; a ΔD50 of less than or equal to 50 nm; a Dmode less than or equal to 72 nm; and an Occluded Volume Index greater than or equal to 1.30.

10. The rubber composition of claim 9 wherein the CTAB of the carbon black is 140–250 m$^2$/g; the CDBP of the carbon black is 120–150 cc/100 g; the Tint value of the carbon black is 145–180%; the ΔD50 of the carbon black is less than or equal to 47 nm; the Dmode of the carbon black is 40–67 nm; and the Occluded Volume Index of the carbon black is 1.40–2.0.

11. The rubber composition of claim 10 wherein the ΔD50 of the carbon black is 20–45 nm.

12. The rubber composition of claim 9 wherein the carbon black is further characterized by having a N$_2$SA greater than or equal to 150 m$^2$/g, and less than 180 m²/g; and a DBP of greater than or equal to 140 cc/100 g.

13. The rubber composition of claim 12 wherein the DBP of the carbon black is 140–180 cc/100 g.

14. The rubber composition of claim 9 wherein the carbon black is incorporated in an amount of from about 10 to about 100 parts, by weight.

15. The rubber composition of claim 14 wherein the carbon black is incorporated in an amount of from about 10 to about 45 parts, by weight.

16. The rubber composition of claim 9 further comprising silica in an amount of from about 5 to about 30 parts by weight.

* * * * *